United States Patent Office 2,996,394
Patented Aug. 15, 1961

2,996,394
HYDROPHOBIC PORTLAND CEMENT
Ulrich W. Stoll, Ann Arbor, Mich., assignor to the United States of America as represented by the Secretary of the Navy
No Drawing. Filed Apr. 16, 1959, Ser. No. 806,984
3 Claims. (Cl. 106—95)
(Granted under Title 35, U.S. Code (1952), sec. 266)

The invention described herein may be manufactured and used by or for the Government of the United States of America for governmental purposes without the payment of any royalties thereon or therefor.

This invention relates to a process for preparing a Portland cement which is resistant to deterioration from atmospheric moisture, and to the product of such process.

Ordinary Portland cement undergoes serious deterioration in storage, due to gradual absorption and chemical reaction with moisture from the atmosphere, becoming caked and useless with time. This is particularly true in the tropics, where humidity is generally high. It is known that the addition of small amounts of oleic acid during the finish grinding of the clinker not only facilitates the grinding, but renders the finished cement "hydrophobic," that is, resistant to attack by atmospheric moisture during storage, prior to its use in mortars or concrete. The use of oleic acid by itself has the serious drawback of entraining large amounts of air when used to make concrete, and is thus not suitable for ordinary structural applications because of the resultant low strength.

In the present invention there is incorporated in the cement, along with the oleic acid and/or other additives, a material which has the effect of decreasing the amount of the air entrained when the cement is used in concrete or mortar, without seriously diminishing the "hydrophobic" properties imparted by the oleic acid and/or other materials. The resulting Portland cement is thus both suitable for normal construction use, and can be stored for extended periods without loss of strength producing properties or caking.

An object of the present invention is to provide an improved hydrophobic cement product.

A further object is to provide a cement which will resist atmospheric deterioration to a degree not present in existing cements.

Further objects and many of the attendant advantages of this invention will be readily appreciated as the same becomes better understood by reference to the following description.

In the grinding of cement clinker to produce Portland cement, it is known to use a fatty acid such as oleic acid to facilitate the grinding operation and to render the fresh cement resistant to atmospheric deterioration. Use of such a grinding aid results in a cement which will entrain large amounts of air when used in concrete and mortar and thus is not usable for normal construction. Such acid may be in impure state, as commercial "red oil," and is usually used in small quantities, such as 0.1 to 0.4 percent of the total product. It may be admixed with an inert material such as sand, and added to the clinker prior to or during grinding thereof.

In the practice of the present invention, in addition to the oleic acid, one of the following agents is added: tri-n-butyl phosphate, undecanol, tetradecanol, and 2-ethyl hexanol. Such agent may be (1) added alone with oleic acid prior to or during grinding operation, (2) added during or after grinding, in the form of a previously mixed concentrate of cement or inert material with the agent, (3) added as a spray into the finished cement as it is transported to the storage bin or silo, prior to sacking operations, or (4) added prior to or during the mixing of the mortar or concrete.

The amount of air-detraining agent required depends on the amount of acid used as a grinding aid and the nature of the agent. For the preferred agent, tri-n-butyl phosphate, the amount is preferably between 0.04 and 0.20 percent of the total product. The cement may after such addition be handled and used in the usual manner, but will withstand long storage and humidity much better than cement not so treated.

Obviously many modifications and variations of the present invention are possible in the light of the above teachings. It is therefore to be understood that within the scope of the appended claims the invention may be practiced otherwise than as specifically described.

What is claimed is:
1. A hydrophobic, non-caking cement product adapted for protracted storage in high humidity areas consisting of Portland cement, 0.1 to 0.4 percent of oleic acid, and 0.04 to 0.20 percent of tri-n-butyl phosphate.
2. A hydrophobic, non-deteriorating, dry cement product adapted for protracted storage in tropical, high humidity conditions consisting of Portland cement, 0.1 to 0.4 percent of an oleaginous material selected from the group of fatty acids consisting of oleic acid, and butyric acid, and 0.04 to 0.20 percent of an air-detraining agent selected from the group consisting of tri-n-butyl phosphate, undecanol, tetra-decanol, and 2-ethyl hexanol.
3. A hydrophobic, non-caking, non-deteriorating, dry cement product adapted for protracted storage in high humidity conditions consisting of Portland cement, 0.1 to 0.4 percent of an oleaginous material selected from the group consisting of oleic acid, butyric acid, cottonseed and coconut oils, and 0.04 to 0.20 percent of an air-detraining agent selected from the group consisting of tri-n-butyl phosphate, undecanol, tetradecanol and 2-ethyl hexanol.

References Cited in the file of this patent
UNITED STATES PATENTS

| | | |
|---|---|---|
| 1,947,504 | Starke | Feb. 20, 1934 |
| 2,776,902 | Scripture | Jan. 8, 1957 |